(12) United States Patent
Hehl (10) Patent No.: US 6,394,780 B1
(45) Date of Patent: May 28, 2002

(54) INJECTION MOLDING UNIT FOR AN INJECTION MOLDING MACHINE

(76) Inventor: Karl Hehl, Arthur-Hehl-Strasse 32, D-72290, Lossburg (DE)

( * ) Notice: Subject to any disclaimer, the term of this patent is extended or adjusted under 35 U.S.C. 154(b) by 0 days.

(21) Appl. No.: 09/743,734
(22) PCT Filed: Jul. 8, 1999
(86) PCT No.: PCT/EP99/04797
§ 371 (c)(1),
(2), (4) Date: Jan. 15, 2001
(87) PCT Pub. No.: WO00/03860
PCT Pub. Date: Jan. 27, 2000

(30) Foreign Application Priority Data

Jul. 14, 1998 (DE) .......................... 198 31 482

(51) Int. Cl.⁷ ............................................. B29C 45/77
(52) U.S. Cl. ...................................... 425/145; 425/542
(58) Field of Search ................................ 425/145, 149, 425/542

(56) References Cited

U.S. PATENT DOCUMENTS 5,421,712 A    6/1995  Laing et al.
5,679,384 A  * 10/1997  Emoto ........................ 264/40.7
6,120,277 A  *  9/2000  Klaus ......................... 264/40.5
6,309,203 B1 * 10/2001  Tamaki et al. ............... 425/145

FOREIGN PATENT DOCUMENTS

| DE | 41 42 927 C1 | 7/1993 |
| DE | 197 31 833 C1 | 1/1999 |
| EP | 0 662 382 B1 | 7/1995 |
| EP | 0 723 848 A1 | 7/1996 |
| GB | 2 331 267 A | 5/1999 |

* cited by examiner

Primary Examiner—Tim Heitbrink
(74) Attorney, Agent, or Firm—Cantor Colburn LLP (57) ABSTRACT

In an injection molding unit for an injection molding machine, two electric drives are provided as electromechanical injection unit and electromechanical dosing unit, the axis of which are aligned with the axis of injection. A compact injection molding unit that is easy to assemble and maintain is achieved due to the fact that the first and second electric drives are disposed on the injection bridge on both sides of a separating plane that extends substantially crosswise to the axis of injection and separates the area of influence of the first electric drive from the area of influence of the second electric drive.

14 Claims, 6 Drawing Sheets

INJECTION MOLDING UNIT FOR AN INJECTION MOLDING MACHINE

FIELD OF THE ART

The invention relates to an injection molding unit for an injection molding machine for the processing of plastic materials and other plasticisable substances. An injection molding unit of this type is for injecting these substances into a mold which can be fixed on the injection molding machine, ceramic substances or other powdery substances being also considered, for example, as the plasticisable substances to be injected.

DESCRIPTION OF THE RELATED ART

An injection molding unit of this type, known in EP 0 662 382 B1, has two electric drives for the screw drive. One motor is for carrying out the rotary motion of the screw, that is for dosing the substance, the other motor is for carrying out the axial displacement of the screw. The two electric drives are configured as hollow-shaft motors and are disposed with their axes in alignment with the axis of the screw and consequently with the axis of injection. To guarantee the interaction of the two motors, they are disposed so as to be displaceable relative to each other, the members driven by the respective rotor engaging one another in a costly manner. Because the two hollow shaft motors nest in one another, they can only be replaced as one unit, which increases both manufacturing costs and servicing costs.

EP 0 723 848 A1 makes known an injection molding unit where two electric drives, configured as hollow-shaft motors, are also used for rotating the screw and for displacing the screw in an axial manner. The motors are disposed in alignment with the axis of injection. To enable displacement of the motors relative to each other, a plurality of spline shafts, which mesh with each other, are provided so that it is possible at any time for either of the motors to displace the feed screw. These spline shafts necessitate tate additional expenditure. The hollow-shaft motors cannot be exchanged independently of one another, at least as far as the rotors of these motors are concerned.

SUMMARY OF THE INVENTION

Proceeding from this related the present invention provides a compact injection molding unit which is simple in design in view of expenditure for assembly and maintenance.

The injection molding unit of the present invention includes: a carrier block for the accommodation of a plasticizing cylinder; a feed screw which is disposed in the plasticizing cylinder along an axis of injection for the injection of the plasticisable substances into a mold; an injection bridge, which is displaceable axially along the axis of injection and on which the feed screw is mounted so as to be displaceable via at least one bearing element; an electromechanical injection unit for the axial displacement of injection bridge and feed screw through the intermediary of a linear displacement means driven by a first electric drive, the axis of the first electric drive being aligned with the axis of injection; and an electromechanical dosing unit for rotating the feed screw through the intermediary of a second electric drive, the axis of the second electric drive being aligned with the axis of injection. The first and second electric drives are disposed on the injection bridge on both sides of a parting plane which extends substantially crosswise to the axis of injection and separates the area of influence of the first electric drive from the area of influence of the second electric drive.

The two electric drives are disposed independently of one another on both sides of a parting plane so that there is no need for costly connection mechanisms. Consequently, components of the individual motors must not go beyond their side. Between the electric drives, which are effective in both directions of the parting plane, a passive space can, consequently, be formed which makes it possible for the two motors to be supported on a common supporting member.

BRIEF DESCRIPTION OF THE DRAWINGS

The invention is described in more detail below by way of the enclosed Figures using an exemplified embodiment. In which.

DETAILED DESCRIPTION OF PREFERRED EMBODIMENT

The invention is now described in more detail in an exemplary manner with reference to the enclosed drawings. The exemplified embodiments, however, are not examples which are meant to restrict the concept according to the invention to a specific physical arrangement.

Figure 1:
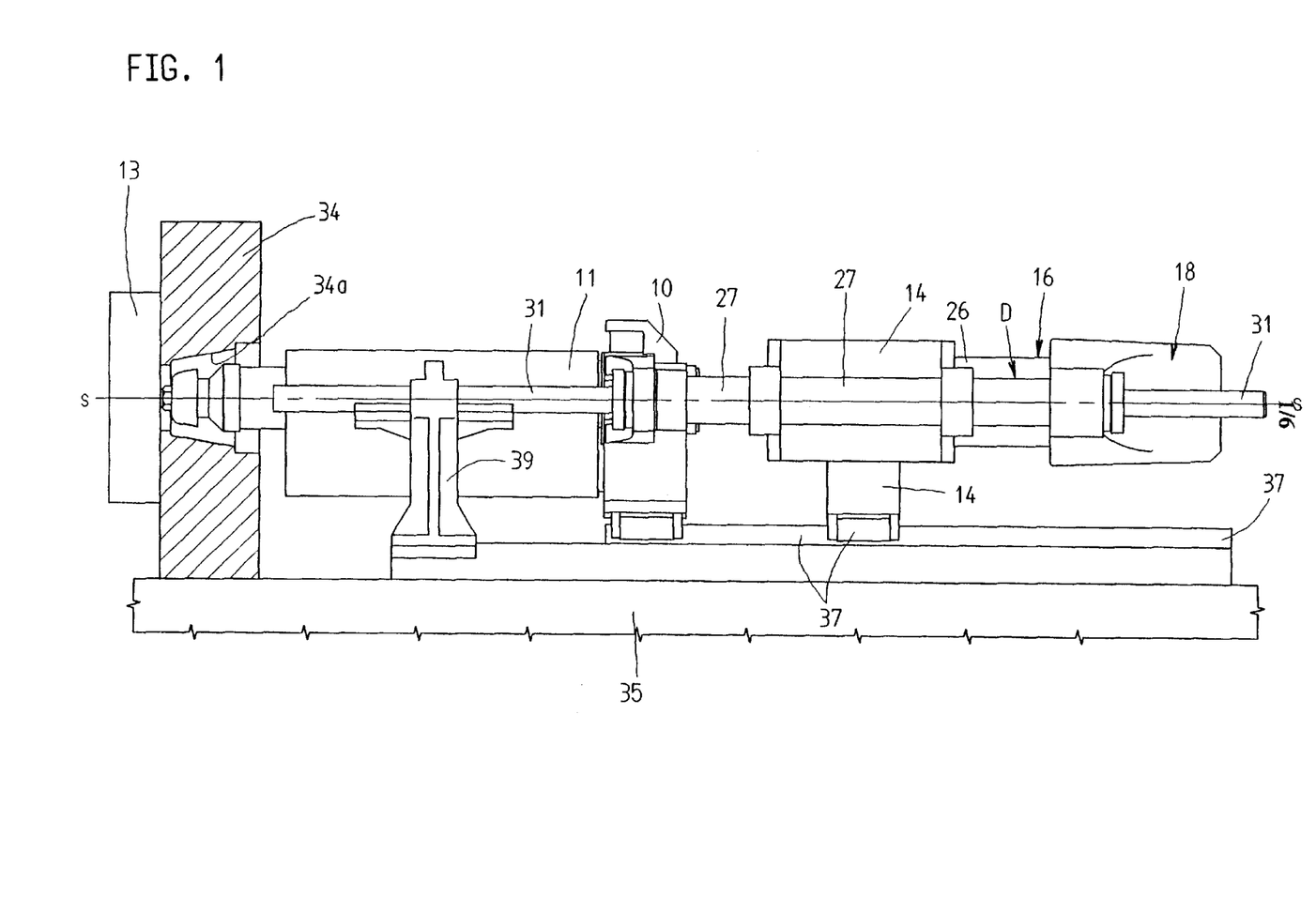
FIG. 1 is a side view of an injection molding unit supported on a machine base and positioned on a mold.

The injection molding unit represented schematically in FIG. 1 is a component part of an injection molding machine and is disposed on the machine base 35 of this injection molding machine. When injecting into a mold 13, a part of which can be seen on the left hand side in FIG. 1, the injection molding unit engages an opening 34a in a stationary mold carrier 34. The injection molding unit on an injection molding machine is for processing plasticisable substances, essentially for injecting these substances, e.g. plastic materials, ceramic substances and other powdery substances into the cavity of the mold 13.

Figure 2:
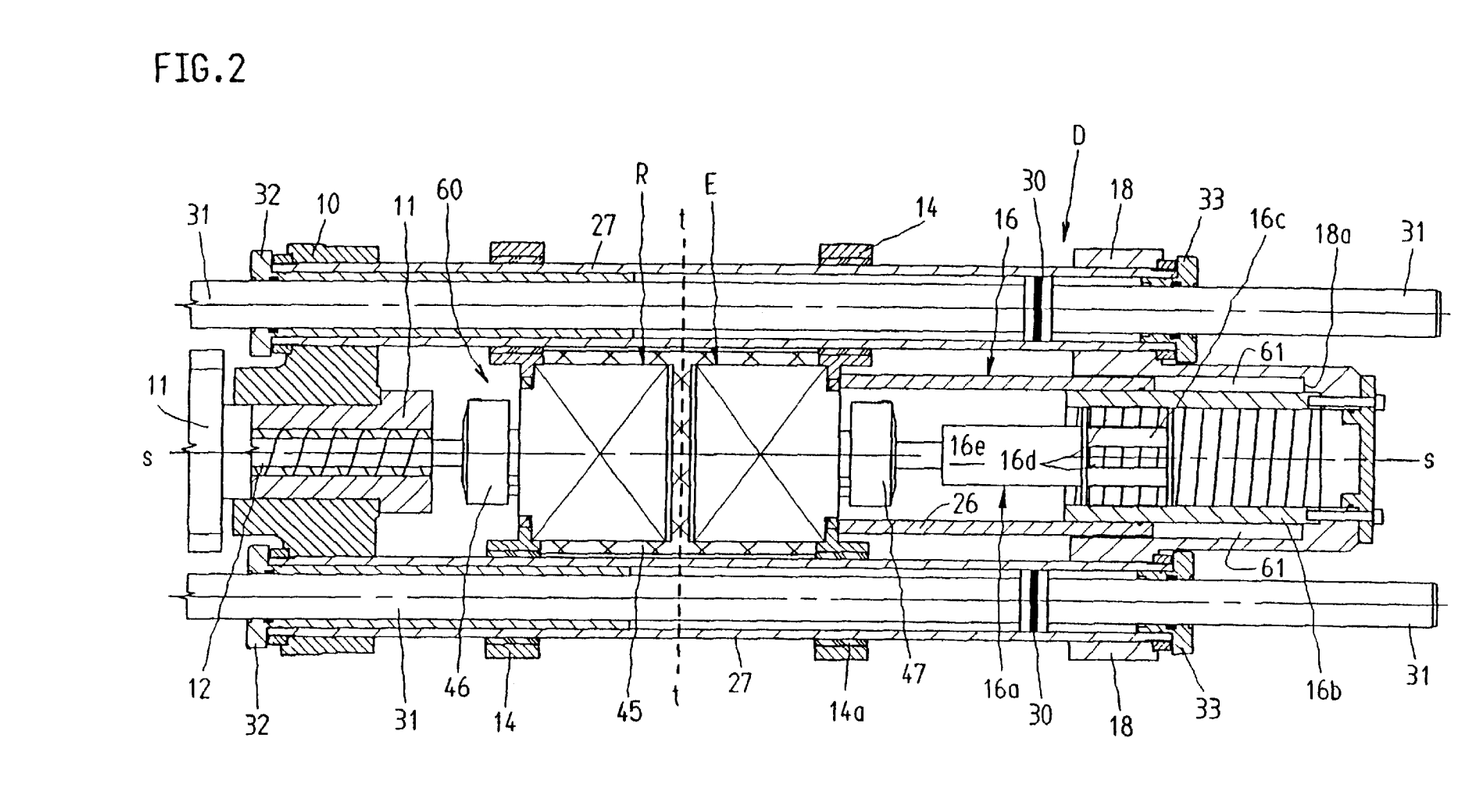
FIG. 2 is a horizontal section through the injection molding unit at the level of the guide braces.

In accordance with FIG. 1, the injection molding machine has a carrier block 10 for accommodating a plasticizing cylinder 11. The feed screw 12, shown in FIG. 2, is disposed along the axis of injection s—s in the plasticizing cylinder 11 for injecting the plasticisable substances into the mold 13. An injection bridge 14 is disposed so as to be displaceable axially in the direction of the axis of injection s—s on braces 31, in the exemplified embodiment on cylinders 27 disposed on these braces 31. The axis of injection s—s coincides for the most part with the central axis of the feed screw 12. The injection bridge 14 is displaced axially via an electromechanical injection unit 16, the linear displacement means 16a of which is rotationally mounted on the injection bridge 14 via at least one bearing member 17, 53. The linear displacement means 16a of the injection unit 16 is displaced relative to the axial displacement of injection bridge 14 and feed screw 12 through the intermediary of a first electric drive E, the axis of which is in alignment with the axis of injection s—s.

An electromechanical dosing unit 60 is disposed on the side of the injection bridge 14 located opposite the first electric drive E. This dosing unit is rotated with the feed screw 12 during the preparation in the plasticizing cylinder 11. To this end there is a second electric drive R, the axis of which is also in alignment with the axis of injection s—s.

In accordance with FIG. 2, the first and second electric drives E, R are disposed on a supporting member 45 of the injection bridge 14. The injection bridge 14 itself slides on the cylinders 27 with two identical sliding parts 14a per brace 31, between which the supporting member 45 is clamped. The braces 31 are supported at the front end of the injection molding unit via a carrier 39. When the injection bridge 14 is displaced, this latter slides along a guide 37.

The electric drives E, R are disposed on the injection bridge 14 on two sides of a parting plane t—t which extends essentially transverse to the axis of injection s—s and separates the influence area of the first electric drive E from the influence area of the other electric drive R. Emanating from the parting plane t—t, the second electric drive R extends in the direction of the plasticizing cylinder 11, whilst the first electric drive E with associated linear displacement means 16a extends away from the parting plane t—t in the opposite direction. The first electric drive E, therefore, works to the right in the Figures for the axial displacement of the feed screw 12 with its linear displacement means 16a, although there can also subsequently be an axial displacement of the feed screw 12 to the left through the force frame, formed via the supporting member 18, cylinder 27 and carrier block 10. Contrary to this, the second electric drive R works to the left for the rotation of the feed screw. There must be no other connection between the motors. A passive space is formed so that the parting plane t—t forms a barrier between the two motors.

In principle, the parting plane t—t will, for the most part, be at right angles to the axis of injection as shown in the Figures. It is also possible for the parting plane t—t to extend essentially cross-wise to the axis of injection if on the supporting element 45, for example, two first electric drives E work to the left and to the right next to the one, for example, second electric drive R of the dosing unit 60 for displacing the linear displacement means 16a. If the two first electric drives E work together on a supporting member 18, the areas of influence of the motors are still separated in the Figures to the left and to the right of a parting plane which is then meander-shaped but extends essentially cross-wise to the axis of injection.

This arrangement for the two electric motors E, R reduces the previously high expenditure on construction as neither the motors nor the parts of the rotors have to be inserted into one another. To generate the axial displacement, the linear displacement means 16a is supported on the force frame and consequently outside the injection bridge 14 via the supporting member 18. This can be used for a more sturdy supporting of the entire injection molding unit. It is insignificant which motors are used and this is illustrated by the "black box" in FIG. 2, as long as the motors are suitable for working separately independently of one another to both sides of the parting plane t—t. Slow running motors can be used just as much as the smaller high speed motors with gears which have to be actuated more dynamically because of the smaller rotational mass. Smaller motors also reduce the moments of inertia.

Figure 3:
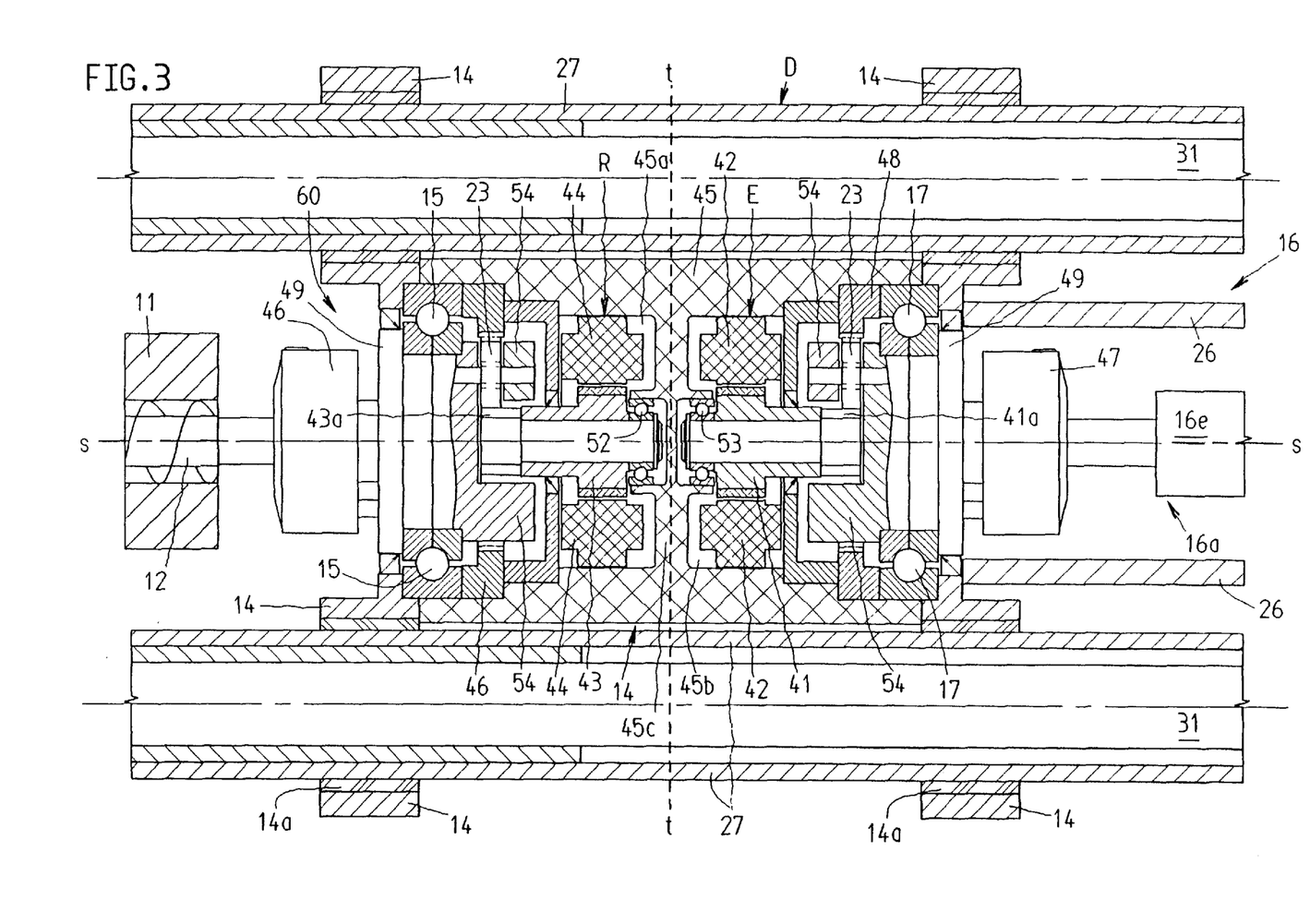
FIG. 3 is an enlarged section from the representation in FIG. 2 in the area of the injection bridge.

The design of the electric drives E, R is clearly shown in FIG. 3. They are extensively similar in construction and are accommodated back to back in recesses 45a, 45b in the supporting member 45. The two recesses 45a, 45b are separated from each other by a general central part 45c. The stator 42 or respectively 44 is situated initially at the bottom of the respective recess. The rotor 41 or respectively 43 of the electric drive is located in the interior of this stator. This rotor is mounted on the supporting member 45 via the bearing member 53 or respectively 52. Gear teeth 41a or respectively 43a are assigned to the rotors 41 or respectively 43, which gear teeth are connected to intermediate gear teeth 23 or planet pinions. These intermediate gear teeth form a planetary gearing which is integrated in the electric drive or at least in the supporting member 45, such that electric drive and gearing form a structural unit which can be prefabricated at the manufacturer's plant and which has only to be supplied to the supporting member 45. The intermediate gear teeth 23 mesh with an outer ring gear 48. From the intermediate gear teeth, the rotation is transmitted to entrainment means 49, which in the center support an axis of connection for the connection of two structurally-similar coupling devices 46, 47. The entrainment means are mounted via bearing members 17 or respectively 15 and are retained in the recesses 45a, 45b together with all other components by the two lateral parts of the injection bridge 14.

In place of the planetary gearing just referred to above, other arbitrary gearing can also be used. Where required, a gear can be dispensed with entirely by using a slow running motor.

In FIG. 3 the two electric drives are not only similarly designed but the two electric drives are also disposed in a mirror symmetrical manner, even with reference to the coupling devices 46, 47. However, this symmetry and similar design can be dispensed with. The feed screw 12 is connected on the one hand on the coupling devices and the linear displacement means 16a on the other hand. This means that, where required, it is possible to replace only one of the two electric drives independently of the other. Over and above this, the manufacturer will spend a smaller amount on storage holding the corresponding electric drives for injecting and dosing.

FIG. 2 explains the design of the injection unit 16. The linear displacement means 16a is driven by the first electric drive E as already described. The linear displacement means 16a of the injection unit 16 has a spindlehead 16c which engages in a member which is configured as threaded sleeve 16b and interacts with the linear displacement means 16a. The threaded sleeve 16b is fixedly supported on the supporting member 18. Between spindlehead 16c and threaded sleeve 16b are disposed a plurality of planets 16d interacting with these latter such that the torque can be further translated here. This also contributes to the retention of identical electric drives E, R. The rod 16e of the linear displacement means 16a supports the spindlehead 16c. Coaxially to the axis of the rod 16e and supported on the injection bridge 14, there is a pipe 26 which engages in recesses 61 between threaded sleeve 16b and supporting member 18 in every position of the injection unit 16. In this respect, the supporting member 18 forms a pan-like recess 18a.

Other systems can obviously also be used in place of the linear displacement means 16a described here, such as, for example, spindle systems, ball spindles or gear racks. The prerequisite condition is solely the generation of linear displacement.

The injection bridge 14 is mounted so as to be axially displaceable on the cylinders 27 of an hydraulic piston-cylinder unit D. The piston-cylinder unit D is for positioning the injection molding unit onto the mold 13. Guide braces 31 simultaneously form the piston rods for the cylinders 27 and to this end support a rotary piston 30. The carrier block 10 is fixed in the area of the front cylinder cover 32 and the supporting member 18 in the area of the rear cylinder cover 33. Supporting member 18 and carrier block 10 together with the cylinders 27 form the rigid force frame which increases precision. Between carrier block 10 and supporting member 18, the injection bridge 14 is supported on the cylinders 27 so as to be axially displaceable but rotational.

During dosing the second electric drive R is driven and rotates the feed screw 12 as mentioned earlier. As the substance prepared increases and, on account of the feed screw rotating, amasses in front of the feed screw, the feed screw 12 and consequently the injection bridge 14 is pressed back. To preserve the predetermined dynamic pressure, the axial force on the feed screw can be increased or reduced by the first electric drive E of the injection unit 16 by simultaneously rotating the feed screw 12 at a freely selectable torque and a freely selectable speed. To this end the rod 16e is rotated, generating, via interaction of the parts of the injection unit 16, an axial displacement of the linear displacement means 16a, supported on the supporting member 18. This displacement leads to the desired withdrawal of the feed screw 12 or respectively injection unit 16. The connected injection is effected essentially only through the intermediary of the first electric drive E in the manner just described.

Where required, the pipe 26 can also be used as a power transmission member to relieve the rod 16e or to enable it to be sized in another manner. For this, however, a connection (not illustrated in the drawings) must be created between threaded sleeve 16b and pressure pipe 26, by, for example, the forces being transmitted from the threaded sleeve 16b to the spindlehead 16c via the planets 16d. The spindlehead could then work on an axial bearing member via a shoulder and transfer the forces to the pipe, which, where necessary, can be effected in not attending the linear displacement means.

Figure 4:
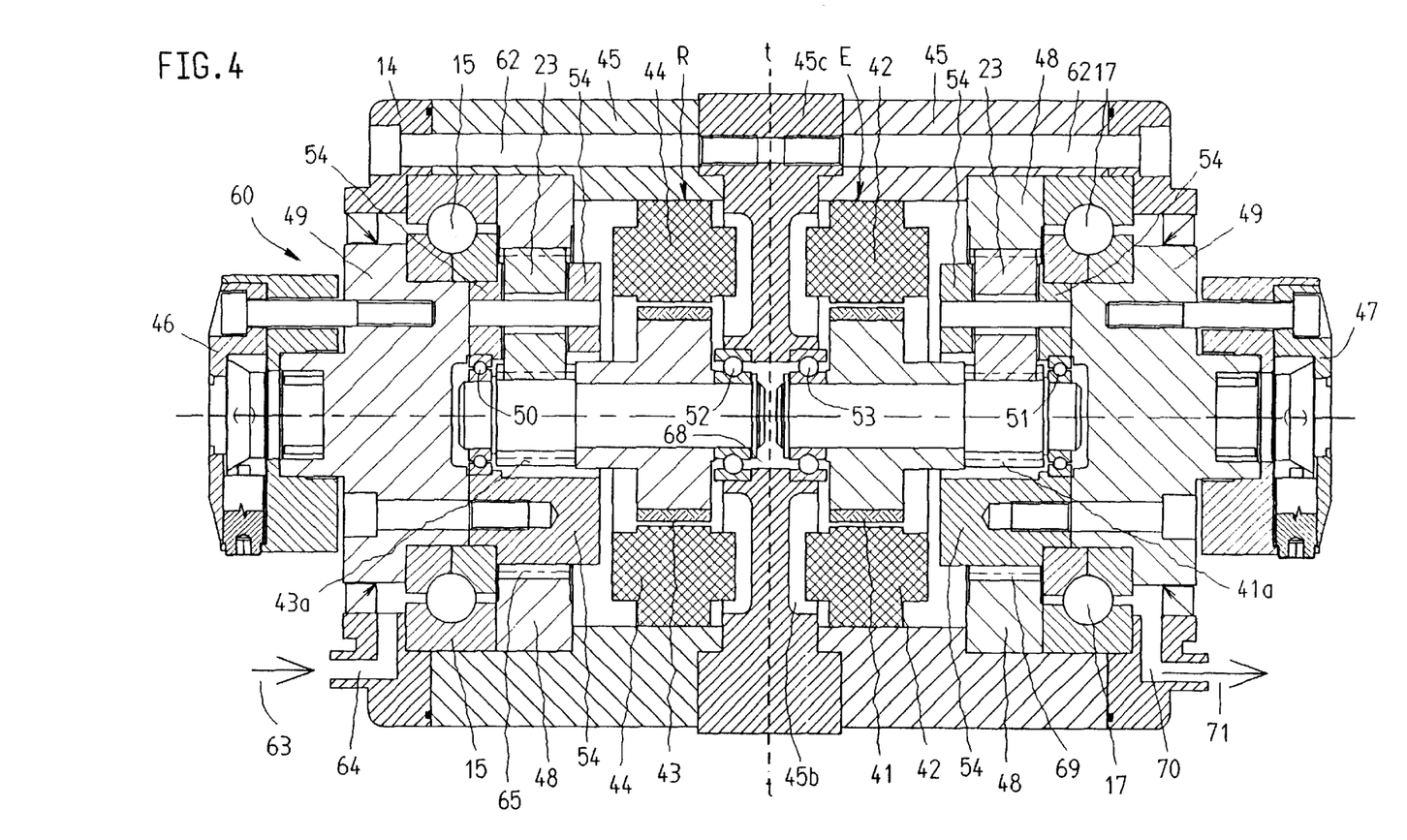
FIG. 4 is another exemplified embodiment of the supporting member in a representation as in FIG. 3.

FIG. 4 shows another exemplified embodiment of the supporting member 45. The central part 45c here is a separate part which braces the outer parts of the injection bridge 14 with the supporting element 45 via securement means 62. This means that the rotors 41, 43 are also mounted in another manner in the area of the central part 45c.

Another essential difference is most certainly the flow of the coolant lubricant indicated. A medium passes into the injection bridge 14 in the direction of the arrow 63 via the duct 64. From there it passes into the bearing 15, passes through this latter and the duct 65 to the rotor 43 until it reaches the passage area 68 between the motors. Past the rotor 41 it passes via the duct 69 and the bearing 17 to the duct 70 so as to be drawn off via the arrow 71. The medium can simultaneously cool the drives E, R and lubricate the movable parts. There is no need to separate lubricant and cooling medium where the lubricant (oil) is simultaneously the coolant, which also means that there is no need for a seal between these areas. As a hydraulic medium is provided anyway on the machine for the cylinders 27, even this hydraulic medium can be used as lubricant and coolant.

Figure 5:
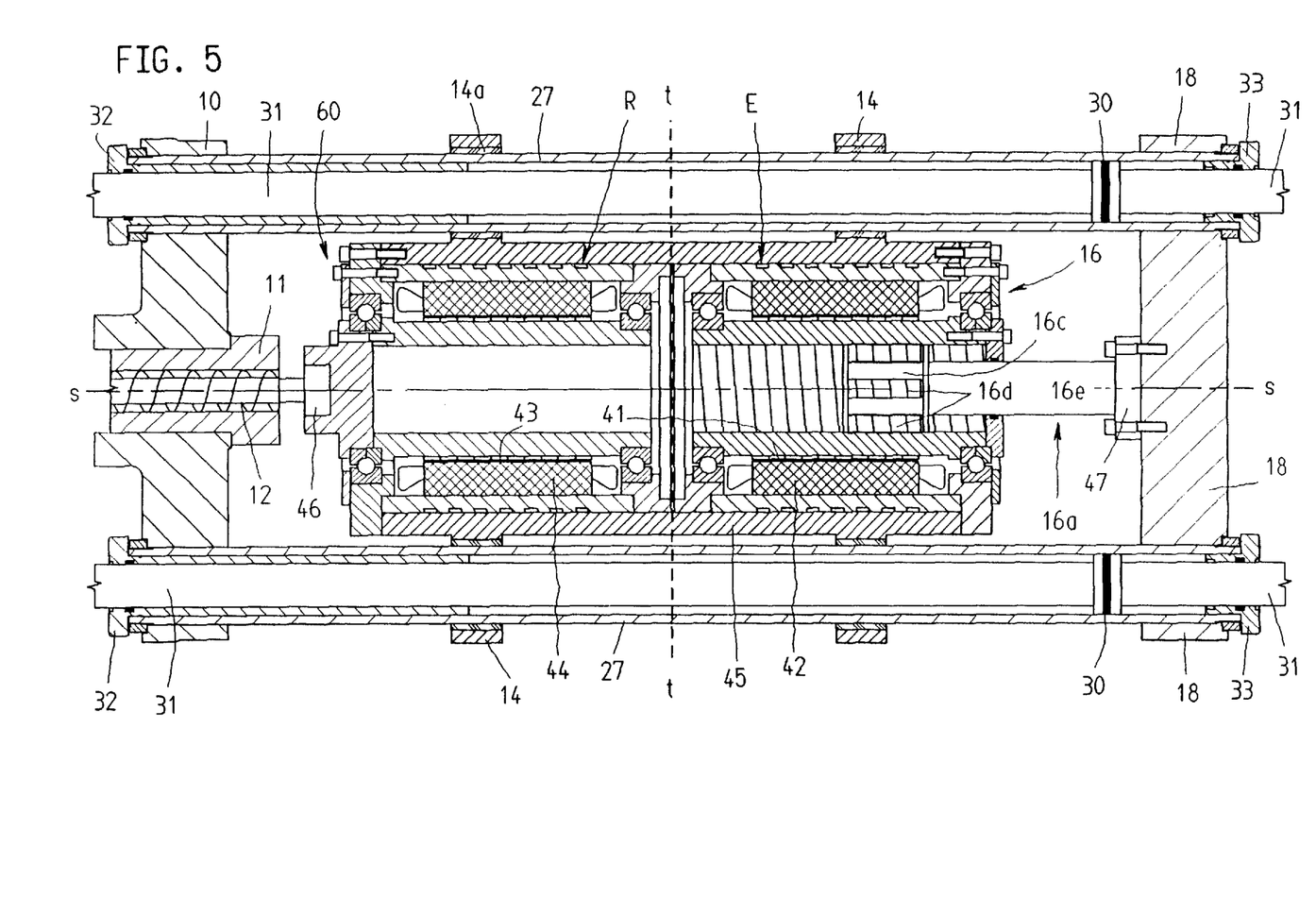
FIG. 5 is a representation as in FIG. 2 in another exemplified embodiment.
Figure 6:
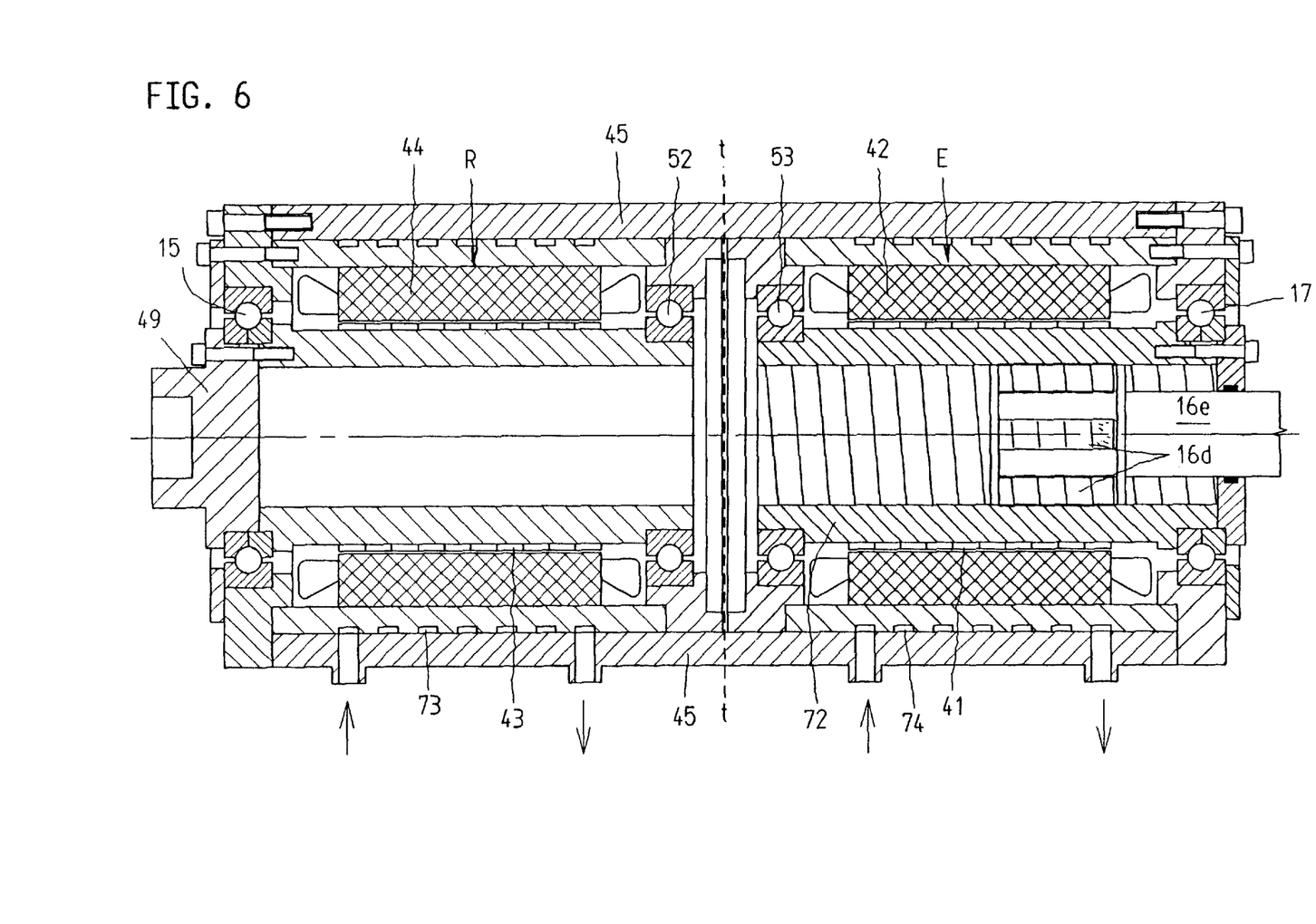
FIG. 6 is an enlarged section from the representation in FIG. 5 in the area of the injection bridge.

FIGS. 5 and 6 show another exemplified embodiment. The two electric drives here are cooled hollow-shaft motors. As rotor 43, electric drive R drives a hollow-shaft which is connected to the entrainment means 49 to the left in FIG. 6. Via rotor 41, electric drive E drives a hollow shaft 72, configured as a threaded sleeve, in which the linear displacement means 16a engages, which is fixedly supported on the supporting member 18 and works in a reverse manner relative to FIG. 3. The liquid cooling is effected in the direction of the arrow via the cooling ducts 73,74 which run round the motors externally. The length of the hollow-shaft (rotor 43) of the hollow-shaft motor is preferably adapted to the maximum stroke of the feed screw 12 or corresponds to the same, thus ensuring that the entire unit can be designed to be more compact.

It is obvious that this description can be subject to the most varied modifications, amendments and adaptations which are in the field of equivalents to the attached claims.

What is claimed is:

1. An injection molding unit for an injection molding machine for the processing of plastic materials and other plasticisable substances, comprising;
    a carrier block for the accommodation of a plasticizing cylinder;
    a feed screw which is disposed in the plasticizing cylinder along an axis of injection for the injection of the plasticisable substances into a mold;
    an injection bridge, which is displaceable axially along the axis of injection and on which the feed screw is mounted so as to be displaceable via at least one bearing element;
    an electromechanical injection unit for the axial displacement of injection bridge and feed screw through the intermediary of a linear displacement means driven by a first electric drive, the axis of the first electric drive being aligned with the axis of injection; and
    an electromechanical dosing unit for rotating the feed screw through the intermediary of a second electric drive, the axis of the second electric drive being aligned with the axis of injection,
    wherein the fist and second electric drives are disposed on the injection bridge on both sides of a parting plane which extends substantially crosswise to the axis of injection and separates the area of influence of the first electric drive from the area of influence of the second electric drive.

2. The injection molding unit in accordance with claim 1, wherein emanating from the parting plane, the second electric drive extends in the direction of the plasticizing cylinder, whilst the first electric drive with the associated linear displacement means extends away from the parting plane in the opposite direction.

3. The injection molding unit in accordance with claim 1, wherein the first and second electric drives are disposed on a supporting member of the injection bridge and that the linear displacement means is supported outside the injection bridge on a supporting member.

4. The injection molding unit in accordance with claim 1, wherein the first and second electric drives are accommodated back to back in recesses in a supporting member of the injection bridge.

5. The injection molding unit in accordance with claim 1, wherein the first and second electric drives are constructed the same.

6. The injection molding unit in accordance with claim 1, wherein the first and second electric drives with the associated planetary gearing form one structural unit.

7. The injection molding unit in accordance with claim 1, wherein the linear displacement means of the injection unit, connected to a rotor of the first electric drive, has a spindlehead which engages a member which is configured as a threaded sleeve and interacts with the linear displacement means, which member is fixedly supported on the supporting member.

8. The injection molding unit in accordance with claim 7, wherein between spindlehead and threaded sleeve a plurality of planets are disposed interacting with the former.

9. The injection molding unit in accordance with claim 7, wherein a rod of the linear displacement means supports the spindlehead and co-axially to the axis of the rod is surrounded by a pipe which is fixedly supported on the injection bridge, which pipe engages the supporting member in each position of the injection unit.

10. The injection molding unit in accordance with claim 1, wherein a hydraulic piston-cylinder unit is provided for the positioning of the injection molding unit to the mold, the cylinders of which are axially displaceable on the stationary piston rods, which are configured as braces and together with carrier block and supporting member form a frame.

11. The injection molding unit in accordance with claim 10, wherein the carrier block is secured in the area of the front cylinder cover and the supporting member in the area of the rear cylinder cover, and that the injection bridge is axially displaceable between the carrier block and the supporting member on the cylinders of the piston-cylinder unit and is supported in a rotational manner.

12. The injection molding unit in accordance with claim 1, wherein at least one of the first and second electric drives is a hollow-shaft motor.

13. The injection molding unit in accordance with claim 12, wherein the length of the hollow shaft corresponds to the maximum stroke of the feed screw.

14. An injection molding unit for an injection molding machine for the processing of plastic materials and other plasticisable substances, comprising;
    a carrier block for the accommodation of a plasticizing cylinder;
    a feed screw which is disposed in the plasticizing cylinder for the injection of the plasticisable substances into a mold;
    an injection bridge on which the feed screw is mounted so as to be displaceable;
    an electromechanical injection unit for the axial displacement of the injection bridge and feed screw through the intermediary of a first electric drive; and
    an electromechanical dosing unit for rotating the feed screw through the intermediary of a second electric drive;
    wherein the fist and second electric drives are disposed on the injection bridge on both sides of a parting plane which separates the area of influence of the first electric drive from the area of influence of the second electric drive.

* * * * *